United States Patent [19]
Barley et al.

[11] 3,913,013
[45] Oct. 14, 1975

[54] SPECTRUM ANALYZER

[75] Inventors: Thomas A. Barley; Gustaf J. Rast, Jr., both of Huntsville, Ala.

[73] Assignee: The United States of America as represented by the Secretary of the Army, Washington, D.C.

[22] Filed: July 30, 1974

[21] Appl. No.: 493,003

[52] U.S. Cl................ 324/77 B; 324/79 R; 329/50; 325/329; 325/49
[51] Int. Cl.[2]....................................... G01R 23/16
[58] Field of Search........... 324/77 B, 79 R; 329/50; 325/329, 49

[56] References Cited
UNITED STATES PATENTS

| | | | |
|---|---|---|---|
| 3,071,726 | 1/1963 | Nelson | 324/79 R |
| 3,445,762 | 5/1969 | William | 324/79 R |
| 3,593,184 | 7/1971 | Herrero | 324/79 R |

*Primary Examiner*—Alfred E. Smith
*Assistant Examiner*—Michael J. Tokar
*Attorney, Agent, or Firm*—Eugene E. Stevens, III; Jack W. Voigt; Robert P. Gibson

[57] ABSTRACT

A spectrum analyzer for measuring near-carrier spectrums utilizes only closed loop operation for measuring the spectral energy. Frequency modulated sidebands near a microwave frequency carrier can be examined without introducing any frequency translation byproducts which cannot be cancelled out of the measurement. A highly stable oscillator operating at a relatively low frequency has an output mixed with the input microwave carrier to provide a modulated output signal to a second mixer. The modulated signal is again mixed with the microwave carrier to eliminate the carrier from the spectrum, having the spectrum superimposed on the oscillator signal. The superimposed sideband spectrum is then picked off for observation or measurement.

8 Claims, 2 Drawing Figures

SPECTRUM ANALYZER

DEDICATORY CLAUSE

The invention described herein may be manufactured, used, and licensed by or for the Government for governmental purposes without the payment to us of any royalties thereon.

BACKGROUND OF THE INVENTION

Prior art spectrum analyzers for accomplishing near-carrier spectral analysis involve open loop operation for calibrating measurement equipment. The loop is then closed for the actual measurement. These methods introduce unknown errors by changing the circuit parameter when switching from open to closed loop. One such method of prior art analysis requires modulation of the input carrier to determine where the carrier goes to zero and phase locking the carrier to a local oscillator frequency. Any drift in carrier level or frequency then results in additional instability of the system and resultant errors in measurement

SUMMARY OF THE INVENTION

The apparatus of the present invention is a circuit for measuring the frequency modulation content of energy from a specific radio frequency source. The circuit measures the magnitude of the specific near carrier spectrum being observed. The carrier is modulated by a highly stable, fixed frequency local oscillator which generates a sideband above and below the carrier frequency. The carrier and sideband are then filtered, amplified, and mixed as a local oscillator signal with the carrier frequency to obtain the oscillator frequency as an intermediate frequency output. This process allows the spectral features of the carrier to be superimposed on the local oscillator frequency. Any drift in the carrier is self correcting and is eliminated without adding phase-lock loop instabilities or errors. The spectral energy from the carrier is then obtained by removing the local oscillator signal.

DESCRIPTION OF THE PREFERRED EMBODIMENT

Figure 1:
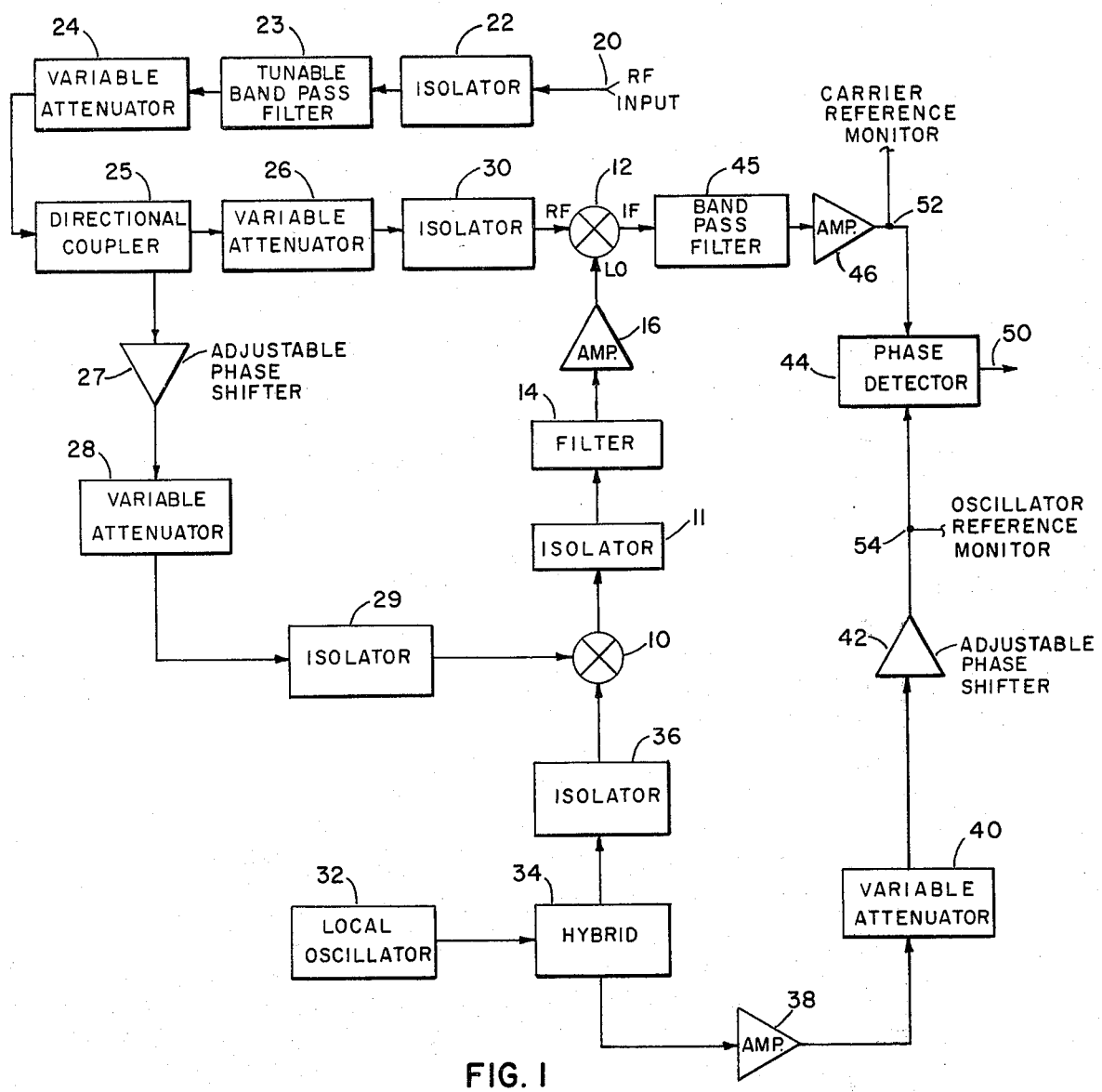
FIG. 1 is a block diagram of a preferred embodiment of the spectrum analyzer for measuring near-carrier spectral energy.

A preferred embodiment of the present invention is as shown in FIG. 1. The system includes a mixer 10 having a radio frequency carrier (RF) input and an intermediate frequency (IF) input for providing a modulated carrier output to a second mixer 12. The output from mixer 10 is coupled serially through an isolator 11, a narrow band, tuned filter 14, and an RF amplifier 16 to an input of mixer 12. When initially received by the system, an RF input signal is coupled to both mixers through input junction 20. The signal flows from junction 20 through an isolator 22, a tunable bandpass filter 23, and an attenuator 24 to a directional coupler 25. The signal is split by directional coupler 25, part of the RF energy being coupled through an adjustable RF phase shifter 27, a variable attenuator 28, and an isolator 29 to an input of mixer 10. Energy is also coupled through a variable attenuator 26 and an isolator 30 to a second input of mixer 12. A high stability local oscillator 32 has an intermediate frequency (IF) output coupled to another input of mixer 10. The output of oscillator 32 is coupled to a hybrid junction where it is divided into two separate outputs. The first output of hybrid 34 is connected through an isolator 36 to mixer 10 and the second hybrid output is connected as an input to an IF amplifier 38. Amplifier 38 has an output coupled in series through a variable attenuator 40 and an adjustable phase shifter 42 to a phase detector 44. Similarly, an output of mixer 12 is coupled through a band pass filter 45 and an IF amplifier 46 to another input of phase detector 44. Signals common to both inputs of detector 44 are cancelled therein while spectral energy superimposed on the output of amplifier 46 is coupled through detector 44 to an output junction 50.

The amplitude of the output signal from amplifier 38 is adjustable for matching to the IF level within the output of amplifier 46 to enhance cancellation of common signals within detector 44. The output of amplifier 46 is further sampled at junction 52 to observe the carrier reference level. Similarly, the output of amplifier 38 is sampled at junction 54 to observe the IF signal present.

In operation, an input RF carrier to be measured is coupled into junction 20 through tunable filter 23 and directional coupler 25 to mixers 10 and 12. Filter 23 allows the input stage to be selectively tuned to accept the desired RF signal from a wide band of frequencies, covering, for example, an octave. This eliminates the prior art necessity for a family of narrow band components to span an octave band. Phase shifter 27 is adjusted to insure that the carrier signal coupled through mixer 10 to mixer 12 is in the proper phase relationship with the carrier signal coupled directly to mixer 12. The carrier signal level coupled to mixer 10 is less than the IF level supplied from oscillator 32, by as much as 30 db for example. Thus, the output of mixer 10 will have the characteristic spectrum of the IF signal with the weaker carrier present therewith. The carrier signal and spectrum is supplied directly to mixer 12 through isolator 30. The resultant output signal of mixer 12 will include the RF spectral characteristics superimposed on and translated to the IF signal. The particular IF signal, with the RF spectrum superimposed thereon, is amplified in amplifier 46 and matched to the IF signal level of the output of attenuator 40 by adjusting the attenuator. The two IF signals are adjusted for phase quadrature by adjusting phase shifter 42. The signals are then combined in phase detector 44 so that the IF signal is nulled. This insures that any local oscillator instabilities are removed from the measured signal. The output RF spectrum minus the carrier is then coupled to output junction 50 for coupling to observation or using circuitry.

Figure 2:
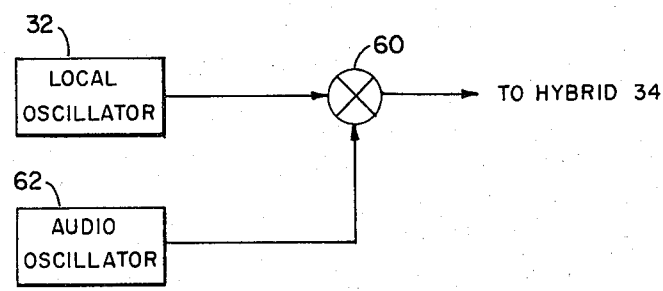
FIG. 2 is a block diagram of the local oscillator circuit of FIG. 1 with an oscillator for calibration coupled thereto.

As shown in FIG. 2 a mixer 60 may be coupled to receive the output of local oscillator 32. An audio oscillator 62 has an output coupled to another input of mixer 60 and the output of the mixer is coupled as the input to hybrid 34. Audio oscillator 62 provides a calibration signal allowing ready detection and thereby adjustment of the local oscillator IF at the phase detector 44 during signal level adjustment for null.

By using a highly stable local oscillator 32 to mix with the incoming RF, the combined RF and IF output signal from mixer 10 serves as a local oscillator signal to translate the RF spectrum to the IF. This allows drifting that occurs in the RF source to be self correcting, eliminating any necessity for phase-locking of the local oscillator to the RF signal. For low level noise measurements phase detector 44 accomplishes both the function of a nulling bridge (eliminating the IF) and of phase detection. The variable phase shifters and attenuators allow selection from a broad spectrum of RF input carriers to be measured. The isolator circuits may be isolation amplifiers or networks which prevent or minimize undesired interaction between stages.

The spectrum analyzer may also function as a circuit to observe local oscillator and output amplifier characteristics. For example, a known high quality RF input at input 20 coupled with a known high quality local oscillator allows the noise added by amplifier 46 to be observed and measured. Similarly, for a known high quality RF input and with an established amplifier 46, the near carrier spectrum of a different oscillator 32 or other frequency source may be analyzed.

Although a particular embodiment and form of this invention has been illustrated, it is obvious to those skilled in the art that modifications may be made without departing from the scope and spirit of the foregoing disclosure. Accordingly, it is understood that the invention is limited only by the claims appended hereto.

We claim:

1. Apparatus for measuring frequency modulated spectral energy comprising: first and second frequency mixers, an output of said first mixer being coupled as a first input of said second mixer; a stable local oscillator having an output coupled as a first input of said first mixer, a radio frequency input for receiving radio frequency input signals, a directional coupler having an input and first and second outputs, a tunable bandpass filter coupled between said radio frequency input and said directional coupler input for selectably tuning a desired radio frequency input signal from an octave band of frequencies to be analyzed, said directional coupler outputs being coupled to respective second inputs of said first and second mixers for selectably mixing the radio frequency input signal with an output signal of said oscillator and thereby obtaining the oscillator frequency with RF spectral sidebands as an output of said second mixer.

2. Apparatus for measuring frequency modulated spectral energy as set forth in claim 1 and further comprising a phase detector having a first input coupled to the output of said local oscillator and a second input coupled to the output of said second mixer for obtaining the RF spectral sidebands as a differential output signal.

3. Apparatus for measuring frequency modulated spectral energy as set forth in claim 2 and further comprising a hybrid junction having an input connected to the output of said local oscillator, a first output of said junction being coupled to the first input of said first mixer and a second output being coupled to the first input of said phase detector.

4. Apparatus for measuring frequency modulated spectral energy as set forth in claim 3 and further comprising a first phase shifter connected between said directional coupler and said second input of said first mixer for aligning the phase of said RF input signal with the RF input signal coupled directly to the second input of said second mixer; and a second phase shifter coupled between the first input of said phase detector and said hybrid.

5. Apparatus for measuring frequency modulated spectral energy as set forth in claim 4 and further comprising a first IF amplifier connected between the output of said second mixer and the second input of said phase detector, and a second IF amplifier connected between the second output of said hybrid and the input of said phase shifter for equalizing the level of amplitude of the oscillator output signal.

6. Apparatus as set forth in claim 5 and further comprising a first isolator connected between said first mixer and said directional coupler, a second isolator connected between said second mixer and said directional coupler, a third isolator connected between said first mixer and said hybrid, and a fourth isolator connected between said first mixer and said second mixer for preventing feedback of unwanted signals into respective stages.

7. Apparatus as set forth in claim 6 and further comprising a series connected tunable filter and RF amplifier coupled between said first mixer output and the first input of said second mixer for enhancing the oscillator modulated, radio frequency output of said first mixer.

8. Apparatus as set forth in claim 7 and further comprising a third mixer coupled between said local oscillator output and said hybrid input, and an audio oscillator having an output connected to a second input of said mixer for coupling a calibrating signal thereto; said third mixer combining the output of said oscillators to provide audio sidebands on the output IF signal for providing said calibrating signal.

* * * * *